Aug. 4, 1959 V. B. BOWERS 2,897,911
COLLAPSIBLE SUPPORTING TRESTLE
Filed July 28, 1955
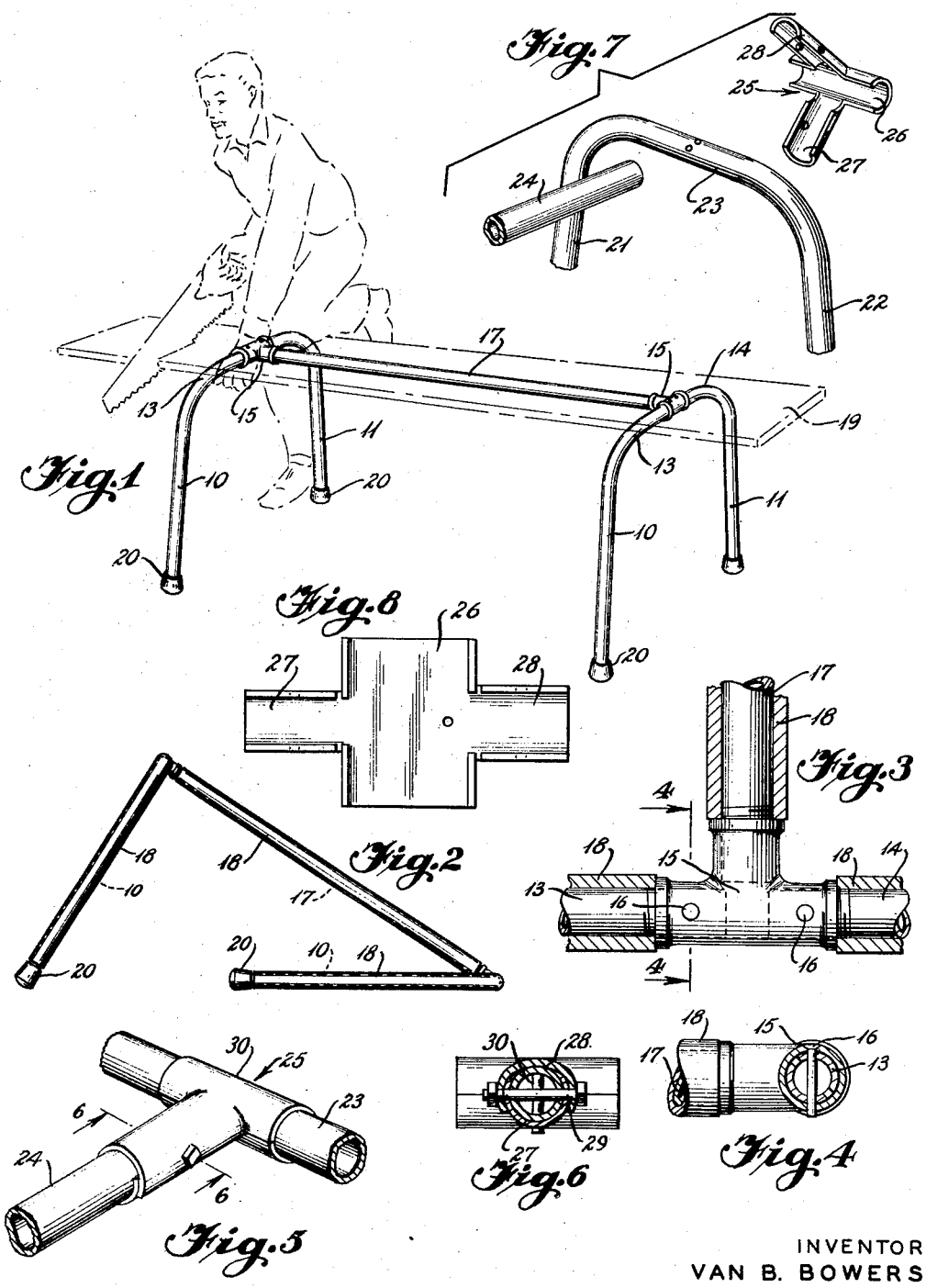
INVENTOR
VAN B. BOWERS
BY A. Yates Dowell
ATTORNEYS

United States Patent Office 2,897,911
Patented Aug. 4, 1959

2,897,911

COLLAPSIBLE SUPPORTING TRESTLE

Van B. Bowers, Athens, Ala.

Application July 28, 1955, Serial No. 524,927

3 Claims. (Cl. 182—155)

This invention relates to the production on location of buildings and other structures of various kinds, and more particularly, to equipment employed, including that by which the work is supported during the treatment of the same by the workmen.

The invention relates specifically to supports on the order of trestles or saw horses used by carpenters or other workmen during sawing or the performance of other work, although obviously the present invention may be used in other ways.

Saw horses or trestles have been made of wood and other materials, but they have been unsatisfactory because they were awkward to handle due, among other things, to their being of a fixed size, incapable of being collapsed, and they were likewise rough and likely to cause injury to polished surfaces.

An object of the present invention is to provide a simple, practical and efficient trestle for use by workmen such as carpenters or the like which overcomes the defects of the prior devices.

Another object of the invention is to provide a collapsible trestle or saw horse of general utility which can be readily erected and can be collapsed for transportation and storage.

A further object is to provide a coupling means for connecting elongated elements in angular relation and to permit ready erection and adjustment of the parts thereof.

Other objects and advantages of the invention will be apparent from the following description taken in conjunction with the accompanying drawing wherein:

Fig. 1 is a perspective view of one form of trestle in operative position and showing a workman sawing a board in phantom line;

Fig. 2, a front view showing one U-shaped frame in operative position and the other U-shaped frame in an inoperative partially collapsed position so the trestle forms a tripod support;

Fig. 3, an enlarged fragmentary detail in plan showing one form of connection between the legs at one end of the trestle and the connecting strut member with plastic tube covering shown in section;

Fig. 4, a section taken on line 4—4 of Fig. 3 showing the releasable key construction in use to provide for rigidity and permitting collapse upon removal of the key;

Fig. 5, a perspective of fragmentary portion of a trestle with another form of connecting coupling with the plastic protective covering omitted for simplicity;

Fig. 6, a section taken on line 6—6 of Fig. 5 showing the attachment of the modified coupling to the longitudinal strut;

Fig. 7, an exploded view of the structure shown in Fig. 5 prior to assembly with the coupling partially bent; and Fig. 8, a partial plan view of the coupling blank shown in Figs. 5–7 of the concave side thereof prior to bending in assembling the parts.

Briefly stated, the present invention comprises a support of general utility particularly useful to carpenters for supporting lumber for sawing or the like and includes a pair of U-shaped or arched end members arranged in spaced generally parallel relation with a connecting member or strut portion extending between the bight portions of the U-shaped members and substantially at right angles to the planes of the U-shaped members. A connecting coupling between each end of the strut member and the adjacent U-shaped member secures the parts together while permitting the U-shaped members to pivot. Removable key means lock the U-shaped members in their generally perpendicular positions to the strut member providing for rigidity thereof in use. The U-shaped members and the strut member are covered with yieldable plastic tubular covers which provide a substantially plane supporting surface and the couplings are arranged to lie within this plane, thereby providing a plane supporting surface on which lumber or other flat articles may be solidly supported without rocking and without marring the surface of the articles. The coupling members are preferably also covered or coated with a resilient coating such as plastic or rubber-like material to prevent damage to polished surfaces or articles supported on the trestle.

With continued reference to the drawing, the work support or trestle of the present invention includes a pair of U-shaped or arched members, each comprising legs 10 and 11 having bight portions 13, 14 respectively formed of tubular material such as metal pipe or the like, the inner ends of the bight portions being threaded and screwed into the cross member of a conventional T-pipe fitting 15 and locked in position by means of locking keys or pins 16 passing through the adjacent portion of the T-fitting and the bight portion of the U-shaped member with the heads of the pins countersunk to avoid any sharp projection. The stem portions of the pipe fittings 15 are secured to an elongated tubular connecting strut member 17 by thread ends of the strut member being screwed into the threaded stem portions of the T-fittings 15.

Plastic tubular covering sleeve elements 18 are passed over the U-shaped members and the strut member with the plastic covering being of sufficient thickness to extend above any projections on the T-shaped fittings 15 and the pins 16 to provide a smooth substantially plane upper work-engaging surface on the bight portions of the U members and the strut member so as to solidly support an object having a plane surface such as a board 19 or the like. The plastic tubular covering material 18 is held onto the tubular framework in any suitable means and rubber feet 20 may be secured to the outer ends of the legs 10 and 11 of the U-shaped members to prevent any possibility of damage to a supporting surface, such rubber feet also serving to prevent unintentional removal of the plastic covering material 18.

It will also be apparent that the T-fittings 15 and the head portions of the locking keys 16 may be coated with plastic or rubberlike material to prevent damage to work supported on the trestle.

In another form of the invention, the U-shaped members may be made of a single piece of tubular material as shown in Figs. 5–7 including legs 21, 22 connected by an integral bight portion 23 and connectable to a strut member 24 by means of a modified form of coupling 25, the coupling member being formed of strong although bendable sheet material such as a heavy gauge sheet metal with the blank being of cruciform shape as shown in Fig. 8, the blank including a central portion 26 adapted to be wrapped around the bight portion 23 of the U-shaped member, such central portion being of sufficient length to provide firm engagement over an extended portion of the bight portion of said U-shaped member, lateral extensions 27 and 28 projecting from opposite sides of the central portion 26 and formed of generally trough shape with the open top of the trough 27 adapted to be received within the open bottom of the trough 28 in use as shown in Fig. 6, the trough portions 27 and 28 being secured to the strut 24 by means of a bolt 29 passing through aligned apertures in the troughs 27 and 28, and strut 24, thereby fixedly securing the coupling 25 to the strut 24 while permitting pivotal movement of the U-shaped frame. The U-shaped frame is held in operative position against rotation by means of a locking key or pin 30 which is preferably of a type with a small head and countersunk sufficiently to prevent objectionable protrusion above the surface of the coupling 25. The pin 30 may be inserted at an angle, if desired and any projecting portion of the head would be entirely below the supporting surface portions of the trestle.

It will be apparent that the coupling member 25 may be coated with resilient material which would prevent damage to polished surfaces. Such resilient material could be directly applied to the exterior of the blank shown in Fig. 8 and of a nature which would not be damaged by the bending of the central portion 26 around the bight portion 23 of the U-shaped legs.

It will thus be seen that applicant has provided an efficient collapsible trestle or saw horse of general utility which can be used for supporting many types of articles.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A workman's trestle comprising a pair of spaced arched members and a connecting member attached to the upper portions of said arched members, a T-shaped fitting between said arched members and said connecting member providing an encircling portion for the adjacent arched member and the end portions of said connecting member, a fastener disposed transversely of each of said portions and fastening the parts in assembled relation, a plastic sleeve covering extending around said connecting member of a character that will not mar furniture, and a series of four plastic tubular sleeves of greater thickness than the T-shaped fitting.

2. A work support of general utility comprising a pair of U-shaped members arranged in spaced generally parallel relation, a strut extending between the bight portions of the U-shaped members, connecting means between each end of the strut member and the bight portion of the adjacent U-shaped member providing a pivotal connection for the said adjacent U-shaped member permitting said adjacent U-shaped member to be collapsed and lie generally in the plane of said strut member, means to fix each U-shaped member in its parallel supporting position, and yieldable covering material on the strut member and the U-shaped members extending above the coupling members to provide a supporting surface for flat articles without rocking of such articles.

3. A workman's trestle of a height to support conveniently thereon an object or objects upon which work is to be done comprising spaced arch members and an elongated strut providing a connection between intermediate portions thereof, said arch members being foldable at said connection substantially at right angles to said strut into a position substantially within the plane of said strut, locking means releasably securing said arch members in a supporting position substantially at right angles to said strut, the upper surface of said strut and arch members being disposed with portions of said arch members at opposite sides of said strut at least as high as said connection permitting a board or other object to lie flat on said trestle.

References Cited in the file of this patent
UNITED STATES PATENTS

| D. 174,847 | Anrens | May 31, 1955 |
| 1,380,468 | Drew | June 7, 1921 |
| 1,519,506 | Powers | Dec. 16, 1924 |
| 1,719,440 | Nathan | July 2, 1929 |
| 1,993,968 | Lee | Mar. 12, 1935 |
| 2,436,337 | Smith et al. | Feb. 17, 1948 |
| 2,666,640 | Jennings | Jan. 19, 1954 |
| 2,694,582 | Reside | Nov. 16, 1954 |

FOREIGN PATENTS

| 47,871 | France | Aug. 14, 1937 |